United States Patent [19]
Dalmatov et al.

[11] 3,874,887
[45] Apr. 1, 1975

[54] ACID-RESISTING MATERIAL

[76] Inventors: Vsevolod Yakolevich Dalmatov, Kuskovskaya ul., 3, kv. 20; Inna Pavlovna Kim, S. Kovalevskoi ul., 10 korp. 3, kv 214, both of Moscow; Tamara Georgievna Voronkova, Polovaya ul., 9, Skhodnya; Nikolai Alexeevich Moschansky, Bronitsky per., 3 kv. 11, Moscow, all of U.S.S.R.

[22] Filed: Oct. 24, 1972

[21] Appl. No.: 300,309

Related U.S. Application Data
[63] Continuation-in-part of Ser. No. 89,436, Nov. 13, 1970, abandoned.

[52] U.S. Cl. ............................ 106/84, 106/287.5
[51] Int. Cl. ..................... C04b 15/12, C04b 13/26
[58] Field of Search ............ 106/38.35, 287, 74, 16, 106/84

[56] References Cited
UNITED STATES PATENTS
| | | | |
|---|---|---|---|
| 2,195,586 | 4/1940 | Snell | 106/74 |
| 3,008,205 | 11/1961 | Blaies | 164/16 |
| 3,179,523 | 4/1965 | Moren | 106/38.35 |
| 3,209,420 | 10/1965 | King | 164/16 |

FOREIGN PATENTS OR APPLICATIONS
| | | | |
|---|---|---|---|
| 672,061 | 10/1963 | Canada | 260/DIG. 40 |

*Primary Examiner*—Theodore Morris
*Attorney, Agent, or Firm*—Holman & Stern

[57] ABSTRACT

An acid-resisting material obtained as a result of solidification of a mixture comprising the following components: an aqueous solution of a water-soluble silicate of an alkali metal selected from the group containing sodium and potassium, an inert filler, a hardening initiator and an organic additive taken in a quantity of 0.2–5.0 percent by weight of all components, selected from the group containing furfurol, furfurol-acetone monomer, furfuryl alcohol and the mixtures thereof. The said acid-resisting material features high resistivity to acid permeation which is independent of the duration of the exposure, as well as high resistance to water.

8 Claims, No Drawings

ACID-RESISTING MATERIAL

The present Application is a continuation-in-part of our copending application Ser. No. 89,436 filed Nov. 13, 1970, now abandoned.

The invention relates to construction materials, and more particularly, to acid-resisting materials intended for protective coverings and coatings of floors, apparatus, reservoirs, vessels, bath-tubs and other articles, as well as for construction of acid-proof structures, articles and buildings subject to action of various acids except those containing fluorine.

The hitherto known acid-resisting materials, used for the above-specified purposes, had their compositions based on the aqueous solution of a water-soluble silicate of an alkali metal selected from the group consisting of sodium and potassium, a hardening initiator and inert fillers. However these known materials are not free from a series of disadvantages. They are acid-permeable, insufficiently water-resistant, of poor mechanical strength and have inadequate bonding properties to ceramics, concrete, metals; they are characterized by high deformability (shrinkage), as well as by excessive tackiness of the mixture of the initial components at the placing of this mixture, and by the short setting time thereof, which affects the productivity of labor, when the materials are used for making coatings and structures.

It is an object of the present invention to provide an acid-resisting material being acid-impermeable irrespectively of the time of action of acids thereupon.

It is another object of the present invention to provide a water-resistant acid-resisting material.

It is still another object of the invention to provide an acid-resisting material having increased mechanical strength.

It is a further object of the present invention to provide an acid-resisting material offering increased strength of bonding to concrete, ceramics, metals.

It is a still further object of the present invention to provide an acid-resisting material featuring reduced deformability (shrinkage), which should improve the resistance of coatings and structures to formation of cracks.

Furthermore, it is an object of the invention to reduce the tackiness of the mixture of the initial components of the acid-resisting material and to facilitate the placing thereof, as well as to step up the setting time of said mixture, which should enhance the productivity of labor and the quality of the jobs done with this material.

The herein disclosed acid-resisting material in accordance with the present invention is produced by solidifying a mixture containing sodium silicate, potassium silicate or their mixtures, an inert filler, a hardening initiator and organic additives selected from the group consisting of furfurol, furfurol-acetone monomer, furfuryl alcohol and their mixtures, taken in specific proportions.

The material is prepared by mixing in a specific sequence of the said components, until a truly homogeneous mixture is obtained.

The herein disclosed acid-resisting material (a mortar, a putty, a grade of concrete) has for its major component an aqueous solution of a water-soluble silicate of an alkali metal selected from a group containing sodium and potassium (which may also be referred to as water-soluble potash or/and sodium glass, respectively), a hardening initiator, an inert filler and an organic additive selected from the group consisting of furfuryl alcohol, furfurol and furfurol-acetone monomer and their mixtures. The aforementioned components are uniformly distributed throughout the mixture, their main characteristics being discribed hereinbelow.

An aqueous solution of water-soluble silicate of sodium or potassium, with the silico/alkali ratio ($SiO_2$:$Na_2O$; $SiO_2$:$K_2O$) being within a range, approximately, from 2.4 to 3.6, and having the specific weight substantially within a range from 1.3 gr./cu. cm to 1.45 gr./cu. cm, is taken in a quantity providing for easy placing of the mixture by the commonly practiced methods of construction work, i.e., in a quantity within a range from 9 to 30 per cent by weight of the total weight of the acid-resisting material.

The hardening initiator for solidifying the acid-resisting material may be in the form of, e.g., sodium fluorosilicate ($Na_2SiF_6$), potassium fluorosilicate ($K_2SiF_6$), the grain size being, e.g., below 0.15 mm; it is taken in a quantity ensuring that the solidified acid-resisting material has sufficient strength and water resistance, i.e., in a quantity from 1.0 to 5.0 per cent of the weight of the acid-resisting material; alternatively, any other suitable hardening agent may be used, taken in an appropriate quantity.

For the inert filler to form a mineral carcass in the herein disclosed material, there may be used quartz sand, comminuted rock with a high silica content, such as diabase, basalt, andesite and other acid-resisting kinds of rock, as well as man-made acid-proof materials, e.g., ceramic ones, taken in a quantity of approximately 60 to 90 per cent by weight of the total weight of the acid-resisting material.

When a putty is prepared, it is advisable to have the inert filler in the form of the diabase powder having the grain size not in excess of 0.15 mm, with the content of grains below 0.075 mm in size not less than 60 per cent by weight.

To prepare the herein disclosed acid-resisting material as a mortar, it is advisable to employ for the inert filler a dry mixture containing quartz sand of various degrees of fineness and diabase powder. The quartz sand should not contain clay and lime impurities and should not have the grain size in excess of 1.2 mm.

To prepare the herein disclosed acid-resisting material as a grade of concrete, the filler may be in the form of crushed stone obtained by crushing of acid-proof rock.

The organic additive in a quantity of 0.2 to 5.0 per cent by weight of the total weight of the material is selected from a group consisting of furfuryl alcohol, furfurol and furfurol-acetone monomer. The last-mentioned additive is a product of reaction between furfurol and acetone (see "Synthetic Polymers and Plastics Based Thereon" by A. F. Nikolaev, Moscow, Leningrad, 1964, pp. 600–603).

The furfurol-acetone monomer is a compound of mono- and difurfurilidenacetone having the following structures:

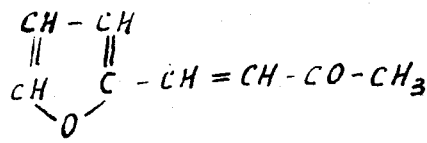   monofurfurilidenacetone;

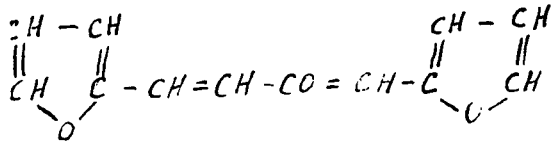

difurfurilidenacetone;

The abovesaid organic additives may be taken either separately or in various combinations, either in pairs or all together.

When the herein disclosed acid-resisting material, after having hardened, is attacked by an acid, the latter, propagating to a small depth into the layer of the material which directly contacts the acid, brings about resinication of the abovesaid organic additive. The thus produced resin-like products change the color of the layer to a specific tint which is different from the color of the rest of the material, and increase the density of the layer, whereby further propagation of the acid into the body of the material is prevented.

The thickness of the above-described layer depends on a number of circumstances, e.g., on the kind, concentration and temperature of the acid; it can be as great as 5–6 mm.

The resinification of the organic additive can be brought about by other external influences, e.g., under the action of elevated temperatures.

Given hereinbelow is a detailed description of one embodiment of the invention, illustrated by a series of examples.

The acid-resisting material is prepared by mixing the components thereof, batched in advance in a desired proportion by weight, either in a mortar mixer or in a concrete mixer.

Initially, for 3–4 minutes, there is mixed the entire amount of inert fillers, needed for a single batch, together with the hardening initiator; then there is added the pre-mixed aqueous solution of either sodium silicate or potassium silicate or both with the organic additive, whereafter mixing is continued for 3 to 5 minutes, until the mixture becomes completely homogeneous.

It is also possible, when preparing the herein disclosed acid-resisting material, to add to the pre-mixed to complete homogeneity aqueous solution of the silicate with the organic additive the mixture of the dry components, containing the inert filler and the hardening initiator.

The acid-resisting material prepared by the herein disclosed method features the setting time from 80 to 90 minutes, depending on the temperature of the mixture, counted from the initial moment of the preparation of the mixture.

To illustrate the abovesaid there is given hereinbelow a series of examples, wherein the components are taken per cent by weight of the total weight of the material.

| Example 1 | |
|---|---|
| Quartz sand | 37.8 |
| Diabase powder | 37.8 |
| Sodium silicate (SiO$_2$:Na$_2$O=2.8) aqueous solution to spec. weight 1.38 gr/cu.cm | 21.0 |
| Sodium fluorosilicate | 2.6 |
| Furfuryl alcohol | 0.8 |
| Example 2 | |
| Quartz sand | 37.8 |
| Diabase powder | 37.8 |
| Sodium silicate (SiO$_2$:Na$_2$O=2.8) in aqueous solution to spec. weight of 1.38 gr./cu.cm | 21.0 |
| Sodium fluorosilicate | 2.6 |
| Furfurol-acetone monomer | 0.8 |
| Example 3 | |
| Quartz sand | 37.8 |
| Diabase powder | 37.8 |
| Sodium silicate (SiO$_2$:Na$_2$O=2.8) in aqueous solution to spec. weight of 1.38 gr./cu.cm | 21.0 |
| Sodium fluorosilicate | 2.6 |
| Furfurol | 0.8 |

EXAMPLE 4

The components are the same as in Example 1, with the difference that for the organic additive, instead of the furfuryl alcohol, there is taken the mixture of substantially equal quantities of furfuryl alcohol and furfurol, also in a total quantity of 0.8 per cent by weight.

EXAMPLE 5

The components are the same as in Example 1, except that for the organic additive, instead of furfuryl alcohol there is taken the mixture of substantially equal quantities of furfuryl alcohol and furfurol-acetone monomer, in a total quantity of 0.8 per cent by weight.

EXAMPLE 6

The components are the same as in Example 1, except that for the organic additive instead of furfuryl alcohol, there is taken the mixture of substantially equal quantities of furfurol and furfurol-acetone monomer, in a total quantity of 0.8 per cent by weight.

EXAMPLE 7

The components are the same as in Example 1, except that for the organic additive instead of furfuryl alcohol there is taken the mixture of substantially equal quantities of furfuryl alcohol, furfurol and furfurol-acetone monomer, also in a total quantity of 0.8 per cent by weight.

EXAMPLE 8

The components are the same as in Example 1, except that for the binder, instead of sodium silicate (SiO$_2$: Na$_2$O=2.8) in aqueous solution to the spec. weight of 1.38 gr./cu.cm, there is taken the mixture of substantially equal quantities of sodium silicate (SiO$_2$:Na$_2$O=2.8) and potassium silicate (SiO$_2$:K$_2$O=3.0) in aqueous solution to the spec. weight of 1.38 gr./cu.cm, also in a total quantity of 21 per cent by weight.

| Example 9 | |
|---|---|
| Crushed diabase | 52.5 |
| Quartz sand | 20.0 |
| Diabase powder | 17.0 |
| Sodium silicate (SiO$_2$:Na$_2$O=2.8) in aqueous solution to the spec. weight of 1.38 gr./cu.cm | 9.2 |
| Sodium fluorosilicate | 1.1 |

-Continued

| | |
|---|---|
| Furfuryl alcohol | 0.2 |
| Example 10 | |
| Crushed diabase | 43.5 |
| Diabase sand | 21.5 |
| Diabase powder | 21.5 |
| Sodium silicate (ratio =2.5) in aqueous solution to the specific weight of 1.38 gr./cu.cm | 11.5 |
| Sodium fluorosilicate | 1.5 |
| Furfuryl alcohol | 0.5 |
| Example 11 | |
| Quartz sand | 37.8 |
| Diabase powder | 37.8 |
| Sodium silicate (ratio =2.8) in aqueous solution to the spec. weight of 1.38 gr./cu.cm | 19.0 |
| Sodium fluorosilicate | 2.3 |
| Furfuryl alcohol | 2.1 |
| Furfuryl-acetone monomer | 1.0 |
| Example 12 | |
| Diabase powder | 60.0 |
| Sodium silicate (ratio = 2.8) in aqueous solution to the spec. weight of 1.38 gr./cu.cm | 30.0 |
| Sodium fluorosilicate | 5.0 |
| Furfuryl alcohol | 5.0 |
| Example 13 | |
| Diabase powder | 77.0 |
| Sodium silicate (ratio = 3.0) in aqueous solution to the spec. weight of 1.30 gr./cu. cm | 19.0 |
| Sodium fluorosilicate | 3.3 |
| Furfuryl alcohol | 0.7 |
| Example 14 | |
| Diabase powder | 75.0 |
| Sodium silicate (ratio = 2.5) in aqueous solution to the spec. weight of 1.45 gr/cu.cm | 21.0 |
| Sodium fluorosilicate | 3.2 |
| Furfuryl alcohol | 0.8 |
| Example 15 | |
| Diabase powder | 71.1 |
| Potassium silicate (SiO$_2$:K$_2$O=3.5) in aqueous solution to spec. weight of 1.38 gr./cu.cm | 25.0 |
| Sodium fluorosilicate | 3.0 |
| Furfuryl alcohol | 0.9 |

It should be understood that, although in the above description each one of the examples relates to a mixture containing specific kinds of the components necessary for the composition of the mixture (such as potash glass for the main binder, sodium fluorosilicate for hardening initiator, quartz sand as the inert filler, furfuryl alcohol as the organic additive), taken in specific quantitave proportion, said examples may be related to other specific kinds of necessary components for the mixture without varying substantially the quantitative proportions specified in these examples. Thus, the above-mentioned examples, which are but different modifications of the embodiments of the invention, are by no means limiting the possible combinations and proportions of the components, and it should be also understood that the above specific compositions may undergo slight changes which do not change the essence of the present invention and do not depart from the spirit and scope thereof.

What we claim is:

1. An acid-resisting material obtained as a result of solidication of a mixture consisting essentially of an aqueous solution of a water-soluble silicate of sodium or potassium, an inert acid-resisting filler, a solid hardening initiator selected from the group consisting of sodium fluorosilicate and potassium fluorosilicate, and an organic additive selected from the group consisting of furfurol, furfurol-acetone monomer, furfuryl alcohol, and mixtures thereof, said additive being present in an amount of from 0.2 to 5 percent of the total weight of said material.

2. A material according to claim 1 wherein said silicate is present in an amount of 9 to 30 percent by weight, said filler is present in an amount of 60 to 90 percent by weight, said initiator is present in an amount of 1 to 5 percent by weight, and said additive is present in an amount of 0.2 to 5 percent by weight of the total weight of said material.

3. A material according to claim 2 containing 0.4 – 3 percent furfurol.

4. A material according to claim 2 containing 0.4 – 2 percent furfurol-acetone monomer.

5. A material according to claim 2 containing 0.2 – 5 percent furfuryl alcohol.

6. A method for the preparation of an acid-resisting material comprising the steps of mixing inert acid-resisting fillers with a solid hardening initiator selected from the group consisting of sodium fluorosilicate and potassium fluorosilicate, mixing a homogeneous aqueous solution of a water-soluble silicate of sodium or potassium and an organic additive selected from the group consisting of furfurol, furfurol-acetone monomer, furfuryl alcohol, and mixtures thereof, mixing said mixture of inert fillers and hardening initiator with said mixture of silicate and organic additive, and mixing the entire mixture until it becomes completely homogeneous.

7. A method according to claim 6 wherein said mixture of silicate and additive is added to said mixture of fillers and initiator.

8. A method according to claim 6 wherein said mixture of filler and initiator is added to said mixture of silicate and additive.

* * * * *